Patented Aug. 15, 1944

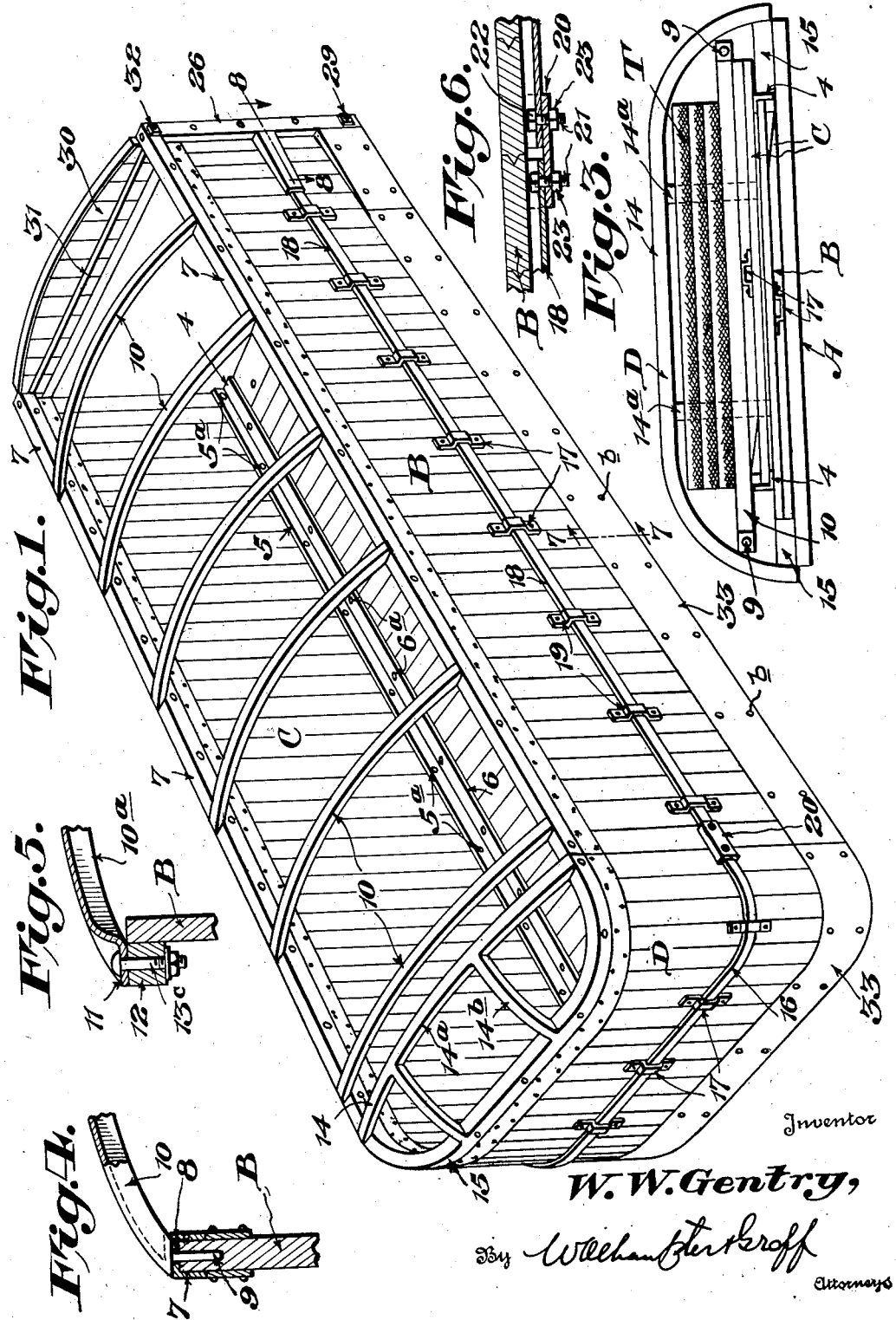

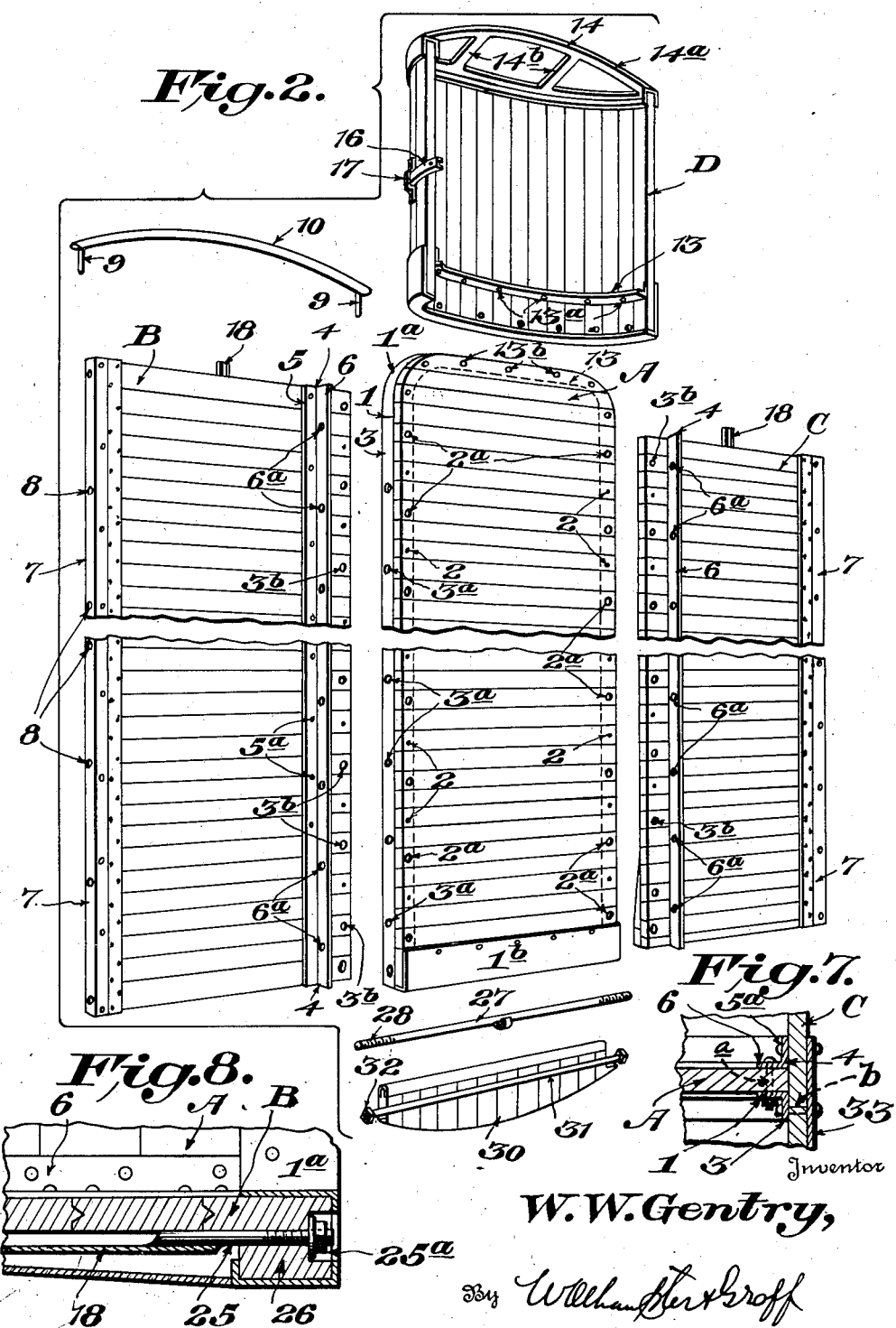

2,355,794

UNITED STATES PATENT OFFICE 2,355,794

VEHICLE BODY CONSTRUCTION

William W. Gentry, Chickasha, Okla.

Application April 20, 1943, Serial No. 483,776

2 Claims. (Cl. 296—27)

This invention relates to vehicle bodies, and more particularly to a novel construction for bodies of the truck van or trailer type which may be readily made in preformed sections.

A primary object of the invention is to provide a body whose several essential parts or units may be easily and readily prefabricated so as to permit of mass production thereby not only to facilitate manufacture and assembly or erection, but also permitting the same to be stacked or packed in a knocked-down condition to provide for the shipment of as many as five of the complete knocked-down bodies in the space normally required for one body as ordinarily assembled for use.

A further object of the invention is to provide a sectionalized body construction which may be readily and quickly assembled in the field with a minimum amount of labor and requiring only the use of conventional tools such as a hammer, screw-driver, wrench or the like, thereby enabling the body to be erected at a port of debarkation, for example, by unskilled or untrained mechanics, and when completely assembled having all of the rigidity and desirable load carrying capacity of an original factory assembled or factory made body.

With the above and other objects in view, which will more readily appear as the nature of the invention is better understood, the same consists in the novel construction, combination, and arrangement of parts hereinafter more fully described, illustrated and claimed.

Referring to the drawings:

Fig. 1 is a perspective view of a completely assembled body made in accordance with the present invention.

Fig. 2 is a composite view including a plurality of perspective views of the several prefabricated parts in sections prior to assembly.

Fig. 3 is an end elevation illustrating how the prefabricated sections of Fig. 2 may be packed in space-saving knocked-down condition for shipment or transportation.

Fig. 4 is a detail sectional view illustrating one form of construction employed for fitting the top ribs or cover supporting bars to the side walls.

Fig. 5 is a detail perspective view illustrating a modification of the construction shown in Fig. 4.

Fig. 6 is a detail horizontal sectional view illustrating the coupling between the tension bands for the front and side sections.

Fig. 7 is a detail sectional view taken on the line 7—7 of Fig. 1.

Fig. 8 is a detail sectional view taken on line 8—8 of Fig. 1.

Similar reference characters designate corresponding parts throughout the several figures of the drawings.

Figure 1 shows the body in the form set up for use but from Fig. 2, it will be observed that the essential units are a bottom section A, the side wall sections B and C and a front section D. Each of these sections is preferably formed of planks or boards having marginal interlocking tongue and groove portions held together by a minimum of steel reinforcement such as angles and channels which are arranged and disposed in a novel manner to also provide for facile assembly.

The bottom section A is provided at the opposite marginal sides thereof with angle irons 1 whose horizontal flanges are secured by the fastenings 2 to the underside of the bottom while the vertical flanges 3 depending therefrom are provided with spaced transverse openings 3a intended to register with the alined transverse openings 3b in the bottom or apron portion of the side sections B and C thereby to receive bolts or similar fastenings during the process of connecting the side walls with the bottom section.

It will also be observed from Fig. 2 that the angle irons 1—1 extend from the rear end of the bottom to a point short of the arcuate portion at the front end thereof. The front end of the bottom section is provided with an angle member 1a having its horizontal flange secured to the underside of the bottom A while the arcuate ends register with the front ends of the side angles 1.

Also, the rear end of the bottom or floor is provided with a metallic scuff plate 1b to reduce wear and tear on the floor at the rear end due to loading and unloading heavy articles.

The inner faces of the side walls B and C are also provided, inward of their bottom edges, with the angle irons 4. The vertical flanges 5 of these angles are secured to the side walls above the openings 3b as indicated at 5a while the horizontal flanges 6, having the openings 6a for registering with the vertical openings 2a in the floor, are intended to overlie the upper marginal portions of the bottom or floor section A when the sides B and C are erected with relation thereto. The registering openings 6a and 2a are intended to receive bolts for fastening the sides and bottom together at their edges.

The upper edges or ends of the side wall forming sections B and C are provided with the inverted channel members 7 (Figs. 1, 2 and 4), and the tops of said channel members 7 are formed with openings 8 registering with drilled sockets in the upper edges of the side walls for receiving and interlocking with the depending dowels 9 of the roof forming ribs 10. These ribs are preferably transversely arched and serve two functions; first, that of connecting and bracing the upper ends of the side wall sections when they are assembled relative to the bottom or floor, and second to support a cover or tarpaulin. As will be observed from Fig. 2, the ribs 10 are provided at each end with said depending dowels 9.

Alternatively, the top ribs 10a may be constructed in accordance with the modification shown in Fig. 5. In this form, the said ribs are provided with flattened end portions 11 which are perforated and rest on a stringer 12 which is also provided with openings to receive bolts 13c for clamping the ends of the ribs 10a to the upper side wall B.

The front section D having the curved ends is provided on its inner face, inward of its bottom edge, with an angle iron 13 whose opposite ends are also curved to conform to the rounded corners of the floor A. The said angle iron 13 is provided with the openings 13a intended to register with the vertical openings 13b at the front end of the floor to receive bolts which pass through the horizontal leg of the angle iron 1a at the front end of the floor when the front section is assembled thereto. The upper end of the front section D is provided with a permanent top skeleton frame 14 which includes the transverse member 14a and the longitudinal bracing portion 14b rigidly united with an inverted channel member 15 which receives the upper end of the material forming the front section D.

The front and side sections are provided with complemental tensioning means for uniting the front section D with the side sections B and C and with the floor A. That is to say, the front section D is provided with a tension band section 16 mounted in the straps 17 and the side sections B and C are provided with the bands 18 also supported in straps 19. The meeting ends of the bands 16 and 18 are provided with a coupling 20 which spans the joint between the meeting edges of the front and side sections. This coupling is shown in Figs. 1 and 6 and is preferably in the form of a channel section overlying the meeting ends of 16 and 18 and is provided with spaced openings or holes for receiving the threaded shanks of a pair of bolts 21. The heads 22 of these bolts are disposed within the channels while their shanks project through openings in the bottoms of the channels to permit the coupling section 20 to be fitted over the joint so that the holes therein will register with the shanks of the threaded bolts. Thus the coupling section 20 may be applied from the outer sides of the bands and the nuts 23 may also be applied from the outside of the body to connect the tension members 16 and 18. The rear ends of the tensioning members 18 are adjustably anchored by a bolt 25 to the post or upright 26 at the rear end of each side wall section B and C. By turning the nut 25a on the bolt whose shank is secured by welding to the band 18, it will be apparent that both bands 18 may be placed in tension and drawn rearwardly to pull the front section D tightly against the side sections and floor to unite all of the sections of the body under compression.

As will be apparent from Figs. 1 and 2 the rear ends of the side sections B and C may be tied together at their bottom corners through the medium of a rod 27 whose ends are threaded as in 28 to receive the nuts 29. Also, the side sections B and C may be united at their upper rear corners by the head piece 30 which includes a web portion made of material similar to the body and the tie rod 31 whose opposite ends are threaded to project through the channels 7, or their equivalent, at the top of the side sections to receive the nuts 32 and thus rigidly tie the upper ends of the side sections together and add to their rigidity when assembled with the arched ribs 10.

As will be observed from Fig. 1, the lower portion of the side sections B and C and the front section D are provided with suitable armor or metallic scuff strips 33 which protect the lower ends of the body against undue abrasion.

The manner of assembling the sections A, B, C, and D, is as follows:

The floor section A having the depending angles 1 and 1a secured to the sides and front thereof, is adapted to have the side sections B and C brought into upright right angular relation thereto so that the horizontal flanges 6 of the angle irons 4 rest on the top of the edges of the floor section A with the openings 6a in registry with the openings 2a in the floor. Conventional bolts a may then be passed through the registering openings 2a—6a to clamp the horizontal flanges of the angles 1 and 4 rigidly against opposite sides of the floor section, and bolts b may be passed through the registering holes 3a—3b to clamp the sides B and C to the vertical flanges of the angles 1 (Fig. 7). In practice the bolts a and b are located respectively at each plank or board in the floor and the side walls B and C and therefore the number of registering openings 2a—6a and 3a—3b are greater in number than actually shown on the drawings, the omission of some being made for sake of clarity in illustration. The front section D with the arcuate ends may then be placed in an upright position and applied to the front end of the floor A in the same manner as the sides. The openings 13a in the horizontal flange of the angle 13 will register with the openings 13b in the floor and the horizontal flange of the angle 1a to receive bolts similar to a for clamping the front section to the front end of the floor, and likewise bolts similar to b may secure the vertical flange of the angle 1a to the lower portion of the front. The arched top ribs 10 are then placed in position due to the construction heretofore described and the head piece 30 is applied to the upper rear corners of the side sections and bolted in place. The transverse tie rod 27 may be secured in position at the rear lower corners of the sides to provide additional stability for the rear end of the structure.

The tension bands 16 and 18 will have their ends adjacent the joint between the front and side sections in spaced relation, and the channel shaped couplings 20 may then be fitted to the bolts 21 so as to unite the front and side tension bands. When the coupling is properly secured, the nut 25a on the bolt 25 at the rear of each side tension band may be turned for tightening and thus draw the front and side sections together and rigidly compress them solidly together due to the inherent resiliency of the wood planks and the metal bands.

When the various parts are assembled in the manner above described, the body is ready for use, and, depending upon the intended use for the body, the arched top ribs may be provided with a cover such as a tarpaulin or other like material providing a covering or roof.

Assuming that the parts shown in Fig. 2 are to be shipped in knocked-down condition, it will be apparent from Fig. 3 how they may be arranged for shipment in compact space saving relation. That is to say, the side sections B and C may be laid over the floor and the arched top ribs 10 laid on top of the section C while the front section D may be placed in overlying relation to the floor A thereby providing a cover for some of the parts, such for example, as the arched top ribs 10, the tarpaulin T and the tools and bolts, which accompany the body for the purpose of effecting assembly at the point of use.

From the foregoing it will be apparent that the distinctive features of the invention reside in the provision of the prefabricated sections and the novel arrangement of means for connecting them to provide a rigid and well braced body after they have been assembled for use.

I claim:

1. A sectional vehicle body construction, adapted to be compactly arranged in knockdown condition for shipment, comprising, in combination, a floor section having rounded front corners, rectangular side sections, and a front section having arcuate corner portions adapted to fit about the rounded front corners of the floor section, means for securing the inner lower portions of said front and side sections to the edge portions of the floor section, cover supporting elements having means at the ends thereof releasably interlocking with the upper edges of the side walls to connect and brace the same, a cover supporting frame permanently fixed to the upper edge of the front section and including transverse member aligning with said cover supporting elements, a flexible cover adapted to be placed over said cover supporting elements, means for clamping the side sections and front section together and compressing the same against the front and side edges of the floor section, said means including a metal band carried by the front section and a complemental band carried by each of the side walls, means for releasably coupling said bands together at the junction of the front and side sections, and means at the rear end of each band on a side section adapted to be manipulated to draw the bands carried by the side sections rearwardly and thereby pull the band carried by the front section through said couplings to place the front and side sections under compression about the edges of the floor section, said floor section, when the body is collapsed constituting a support on which the side sections may be horizontally stacked and the front section being adapted to be placed over the stacked side sections so that the outer edges of the said front section rest on the floor section thereby constituting means to house and maintain the flexible cover and side sections in assembled relation.

2. A sectional vehicle body construction, according to claim 1, wherein the metal bands on the front and side sections are of channel formation with the grooves of the channels facing inwardly and the coupling means at the junction of the front section and side wall sections consists of bolts having their head portions confined between the bottoms of the channels of said bands and the outer faces of said front and side sections while the threaded shank portions of the bolts project through openings in the bottoms of said bands, coupling members adapted to span the meeting ends of said bands and provided with openings for receiving the threaded shanks of said bolts, nuts for said bolts to clamp the coupling members securely in position.

WILLIAM W. GENTRY.